No. 820,045. PATENTED MAY 8, 1906.
V. A. GUDEX.
DENTAL VULCANIZER.
APPLICATION FILED JUNE 18, 1904.
2 SHEETS—SHEET 1.
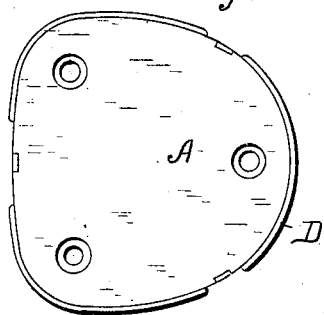
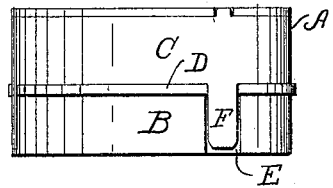
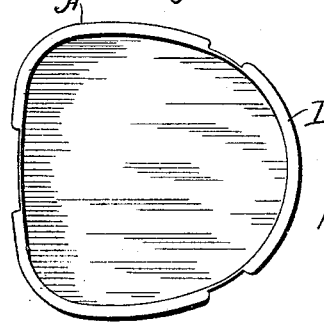
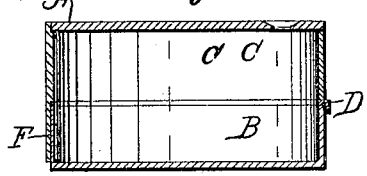
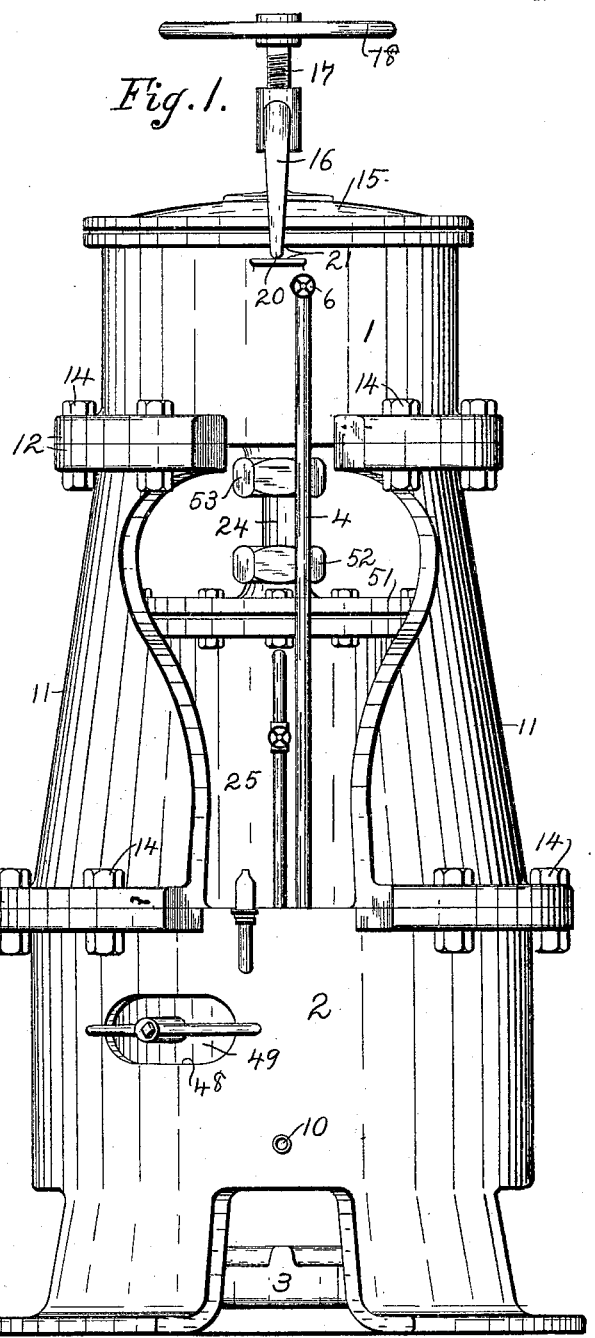
WITNESSES:
INVENTOR
Valentine A. Gudex
BY
Erwin & Shuler
ATTORNEYS.

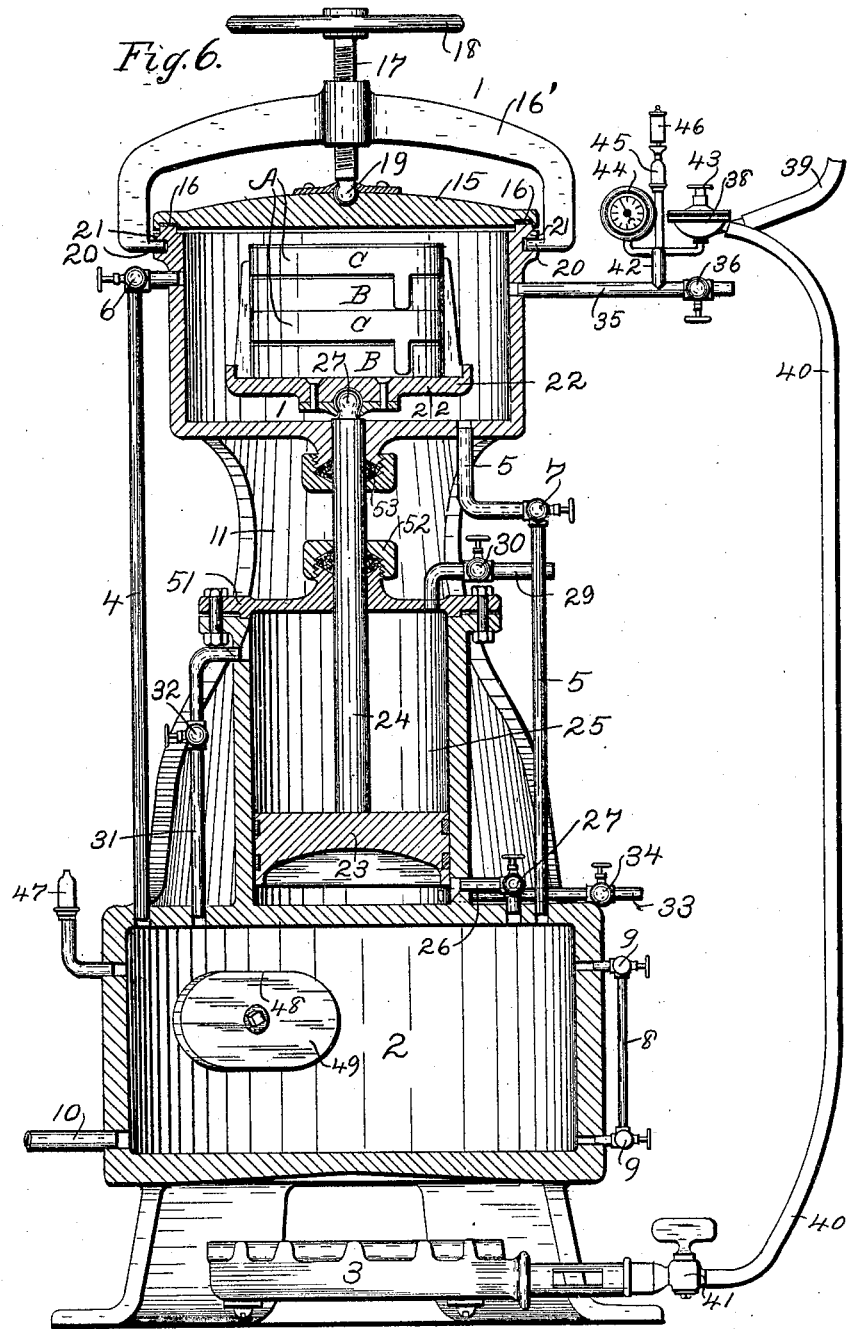

UNITED STATES PATENT OFFICE.

VALENTINE A. GUDEX, OF MILWAUKEE, WISCONSIN.

DENTAL VULCANIZER.

No. 820,045.　　　Specification of Letters Patent.　　　Patented May 8, 1906.

Application filed June 18, 1904. Serial No. 213,081.

*To all whom it may concern:*

Be it known that I, VALENTINE A. GUDEX, a citizen of the United States, residing at Milwaukee, county of Milwaukee, and State of Wisconsin, have invented new and useful Improvements in Dental Vulcanizers, of which the following is a specification.

My invention relates to improvements in apparatus for vulcanizing dental plates.

The primary object of my invention is to provide a device by which a pressure may be automatically applied to the separable parts of the vulcanizing-flask simultaneously with the process of vulcanization of the rubber in the flask.

It is a well-known fact that when the pieces of rubber are placed in the mold of a vulcanizing-flask in a cold condition preparatory to vulcanizing the same it occupies a larger space than it does after it has become heated to a semifluid condition, and it therefore becomes desirable to so construct the vulcanizing-flask that its separable parts may be brought together or in closer proximity as the rubber becomes heated during the process of vulcanization, which desired object is accomplished through the mechanism hereinafter described.

The construction of my invention is explained by reference to the accompanying drawings, in which—

Figure 1 represents a side view of the apparatus complete. Fig. 2 is a top view, Fig. 3 a side view, Fig. 4 a detail, and Fig. 5 a vertical section, of the vulcanizing-flask. Fig. 6 is a vertical section of the apparatus shown in Fig. 1.

Like parts are identified by the same reference characters throughout the several views.

A represents the vulcanizing-flask, which consists of the separable parts B and C and the intermediate removable collar D. The part B is provided with vertical recesses E, and the part C is provided with retaining guide-flanges F, which register with and are adapted to be inserted in the recesses E when the parts B and C are put together. It will be understood that when the mold is being formed preparatory to vulcanizing the rubber in said vulcanizing-flask the collar D is interposed between said separable parts B and C, as shown in Figs. 3 and 5. When, however, said mold is completed and the chamber is packed with rubber, said collar D is removed, whereby a narrow space is left between said separable parts B and C to permit the same to be thereafter forced together during the process of vulcanization, as hereinafter more fully explained.

1 is the steam-chest, in which the vulcanizing-chamber is located during the vulcanizing process.

2 is the generating-chamber, in which water is located and steam generated by which the vulcanizing process is carried out.

3 is a burner of ordinary construction which is used for heating the steam-generator. Steam is conducted from the generator 2 to the steam-chest 1 through the duct 4, and the water arising from condensation of the steam in the steam-chest 1 is permitted to return to the generator 2 through a duct 5. The ducts 4 and 5 are respectively provided with ordinary globe-valves 6 and 7, by which communication between the steam-generator and the steam-chest is controlled at will. The generator 2 is provided with an ordinary sight-glass 8, by which the height of the water in the generator is ascertained. The glass 8 is connected with the generator through valves 9 9, which are of ordinary construction. Water is led to the generator 2 through the duct 10 from the supply and may be forced into the generator against pressure, if desired, by an ordinary force-pump. The steam-chest 1 is supported from the generator 2 by the vertical connecting-walls 11, which walls are connected with the respective parts by the flanges 12 and 13 and a plurality of bolts 14. The steam-chest 1 is provided with a removable cover 15, which cover in turn is provided with a steam-tight packing 16, by which said steam-chest and cover are hermetically sealed by the application of pressure. The cover 15 is held in place upon the steam-chest by the clamping-bracket 16' and screw 17. The screw 17 is provided with a hand-wheel 18, by which it is turned down upon the cover 15 when securing the same in place. The lower end of the screw 17 is connected with the cover 15 by an ordinary ball-and-socket joint 19. The lower end of the clamping-bracket 16' is removably connected with the steam-chest 1 by the inwardly-projecting lugs 20 20, which engage beneath the annular flange 21 of the steam-chest. It will be obvious that by this arrangement the cover and clamping-bracket 16' may by releasing the screw 17 be withdrawn from the steam-chest when putting the vulcanizer A in place and that when the vulcanizer is in place and the cover 15 is again placed upon the mouth of the steam-chest a steam-tight joint is formed between the steam-chest and the cover by turning down the hand-screw 17.

To provide for automatically forcing the separable parts B and C of the vulcanizer together during the process of vulcanization, I support the same upon the movable platform 22, which platform 22 is supported from a steam-actuated piston 23, with which it is connected by the piston-rod 24. The piston 23 is located in the steam-cylinder 25, whereby as steam is admitted to the cylinder 25 beneath the piston 23 said piston will be forced upwardly, thereby carrying with it the platform 22 and the vulcanizer-flask A until the top of the vulcanizer-flask A is brought in contact with the cover 15 of the steam-chest. This being done, the separable parts B and C of the vulcanizer-flask are automatically forced together during the process of vulcanization, as stated, by the action of steam beneath the piston. Steam is communicated to the cylinder 25 beneath the piston therein through the duct 26 and the hand controlling globe-valve 27, while the air above the piston 23 is permitted to escape from the cylinder as it ascends through the exhaust-duct 29 and the globe-valve 30. When desirous to return the piston 23 to the lower end of the cylinder, as will be necessary when opening the steam-chest, the valve 27 is closed and steam is admitted to the cylinder 25 above the piston from the generator 2 through the duct 31 and globe-valve 32, whereby said piston will be forced downwardly by the action of the steam above it. To provide for the steam beneath the piston escaping as the piston is being forced downwardly, I have provided the lower end of the cylinder 25 with an exhaust-duct 33 and globe-valve 34, the globe-valve 34 being opened preparatory to turning the steam on above the piston in said cylinder. Thus it will be obvious that preparatory to opening the steam-chest 1 and placing the flask therein all the valves communicating between the steam-generator 2 and the steam-chest 1 and the cylinder 25 are closed, and that when the flask is in place and the steam-chest closed the valve 27 is opened, whereby the flask is forced up against the cover 15 and whereby the separable parts of the flask are forced and retained together. This being done, the valves 6 and 7 are opened, whereby steam is admitted to the steam-chest around the flask, when it is obvious that as the flask is being heated to the desired temperature the separable parts of the flask will be simultaneously forced together by the action of the steam beneath the piston. When, however, the work of vulcanizing is completed, the valve 27 is closed and the valves 32 and 34 are opened, when steam will be admitted above the piston and the same forced downwardly, whereby the vulcanizing-flask is relieved from the pressure of the piston beneath it. This being done, the valves 6 and 7 are closed, when the steam in the steam-chest is permitted to escape through the exhaust-duct 35 and globe-valve 36. Steam having been permitted to escape from the steam-chest, the cover 15 and connecting parts are readily removed by releasing the screw 17. The platform 22 is preferably connected with the piston 24 by a universal joint 27, which permits the platform 22 to be inclined as may be necessary to conform to the surface of the vulcanizing-flask and other coöperating parts. To provide for regulating the temperature beneath the generator, the admission of fuel-gas (when gas is used) to the burner 3 is governed by an automatic pressure-regulator 38 of ordinary construction, to which gas is led from the supply through the duct 39 and from thence to the burner through the duct 40 and gas-controlling valve 41. The pressure-regulator 38 is governed by the pressure of steam in the steam-chest 1, which is led to it through the duct 35 and branch duct 42. The construction of the regulator 38 is such that as the pressure is increased in the steam-chest 1 it has the effect to check the passage of gas through the regulator, while as the pressure in the steam-chest 1 diminishes the valve controlling the passage of gas through the regulator will be automatically opened, thus increasing the gas-supply to the burner. The pressure-regulator 38 is provided with a hand-actuated screw 43, by which the regulator may be adjusted to maintain any desired gas-pressure, as circumstances may require.

44 is a pressure-gage of ordinary construction, by which the pressure of steam in the steam-chest 1 is indicated.

45 represents an ordinary safety-valve which may be adjusted to permit the steam to escape at any desired pressure.

46 represents a steam-whistle which is adapted to signal an alarm when the steam has reached the limit of safety and is escaping through the safety-valve. The generator 2 is also provided with a safety-valve 47, which may be necessary to provide for the escape of steam when the valves between the generator and the steam-chest 1 are closed.

48 represents an ordinary hand-hole through which the interior of the generator is reached. The same is closed with a cover 49 of ordinary construction. The cylinder-head 51 is provided with an ordinary stuffing-box 52, while the lower end of the steam-chest 1 is provided with a stuffing-box 53 for the reception of the piston-rod 24, which communicates between the cylinder 25 and the steam-chest and by which the steam is prevented from escaping around the piston-rod.

While I have shown and preferably locate the steam-cylinder 25 and steam-chest 1 in a vertical line above the generator 2 and connect them together by the vertical walls 11, it will be obvious that the cylinder and steam-chest, with connecting parts, may, if desired, be located at one side of the generator, in which case the relative arrangement of the steam ducts and passages will be changed accordingly.

It will be understood that the vulcanizing-flask (shown in Figs. 2, 3, 4, and 5) is made the subject-matter of a separate application.

Having thus described my invention, what I claim as new, and desire to secure by Letters Patent, is—

1. In an apparatus of the described class, the combination of a steam-generator; a burner located beneath said generator; a steam-chest provided with a removable cover; means for hermetically closing the cover of said steam-chest; a steam-cylinder; a piston located in said cylinder; a piston-rod communicating from said piston with said steam-chest; a platform pivotally supported upon said piston-rod; a separable vulcanizing-flask located upon said platform; means for conducting steam from said steam-generator to said steam-chest around said vulcanizing-flask; means for controlling the passage of steam from said generator to said steam-chest and from said steam-chest to the exterior air; means for controlling the return of the condensed steam from the steam-chest to the steam-generator; means for controlling the admission of steam at will from the steam-generator to the steam-cylinder beneath the piston and from the steam-generator to the cylinder above the piston and means for controlling the escape of steam from beneath the piston to the exterior air, all substantially as and for the purpose specified.

2. In an apparatus of the described class, the combination of a steam-generator; a steam-cylinder; a steam-chest; means for controlling the passage of steam from the steam-generator to and from the steam-cylinder and to and from the steam-chest; a piston located in said cylinder; a separable vulcanizing-flask located in said steam-chest; means for communicating motion from said piston under steam-pressure to said vulcanizing-flask; a burner located beneath said steam-generator; a pressure-regulator connected with said steam-chest; a gas-duct communicating from the supply through said pressure-regulator with said burner and means for controlling the passage of gas through said pressure-regulator by the pressure of the steam in said steam-chest, substantially as and for the purpose specified.

3. In a dental vulcanizer the combination of a steam-generator; a burner located beneath said generator; a steam-chest provided with a removable cover; means for hermetically closing the cover of said steam-chest; a steam-cylinder; a piston located in said cylinder; a piston-rod communicating from said piston to said steam-chest; a platform supported upon said piston-rod, a separable vulcanizing-flask located in said steam-chest on said platform; means for communicating motion from said piston under steam-pressure to said vulcanizing-flask; means for controlling the passage of steam from said steam-generator to and from said steam-chest, and to and from said steam-cylinder, all substantially as and for the purpose specified.

In testimony whereof I affix my signature in the presence of two witnesses.

VALENTINE A. GUDEX.

Witnesses:
Jas. B. Erwin,
H. Z. Taugher.